United States Patent
Cano Zapata et al.

(10) Patent No.: US 10,728,321 B2
(45) Date of Patent: Jul. 28, 2020

(54) CREATE MACHINE-TO-MACHINE TRUST TO AUTOMATICALLY SHARE RESOURCES BETWEEN INTERNET OF THINGS DEVICES

(71) Applicant: International Business Machines Corporation, Armonk, NY (US)

(72) Inventors: Jose Cano Zapata, Mercedes Norte (CR); Cesar Augusto Rodriguez Bravo, Alajuela (CR); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/921,761

(22) Filed: Mar. 15, 2018

(65) Prior Publication Data
US 2019/0289069 A1    Sep. 19, 2019

(51) Int. Cl.
*H04L 29/08* (2006.01)
*H04L 29/06* (2006.01)
*H04L 12/28* (2006.01)
*H04W 4/06* (2009.01)

(52) U.S. Cl.
CPC ...... *H04L 67/1076* (2013.01); *H04L 12/2809* (2013.01); *H04L 12/2827* (2013.01); *H04L 63/08* (2013.01); *H04L 67/1068* (2013.01); *H04L 67/125* (2013.01); *H04W 4/06* (2013.01)

(58) Field of Classification Search
CPC ....... H04W 4/70; H04W 12/08; H04W 48/08; H04W 4/80; H04L 63/08; H04L 47/10
See application file for complete search history.

(56) References Cited

U.S. PATENT DOCUMENTS

| | | | |
|---|---|---|---|
| 6,823,472 B1 * | 11/2004 | Dekoning | G06F 15/167 710/56 |
| 8,205,245 B2 | 6/2012 | Tam et al. | |
| 2011/0029610 A1 | 2/2011 | Chao et al. | |
| 2013/0080520 A1 | 3/2013 | Kiukkonen et al. | |

(Continued)

FOREIGN PATENT DOCUMENTS

EP    3035721 A1    6/2016

OTHER PUBLICATIONS

Atzori et al. "Social Internet of Things: Turning Smart Objects into Social Objects to Boost the IoT", IEEE Internet of Things, Nov. 11, 2014, 6 pages.

(Continued)

*Primary Examiner* — Chirag R Patel
(74) *Attorney, Agent, or Firm* — Yee & Associates, P.C.

(57) ABSTRACT

Automatically sharing resources between devices is provided. A communication channel is established with a trusted data processing system over a network. In response to establishing the communication channel, a list of resources available for sharing between the data processing system and the trusted data processing system is shared via the communication channel. It is determined whether a match for a resource requested by the trusted data processing system exists in the list. In response to determining that a match for the resource requested by the trusted data processing system exists in the list, a matching resource is automatically shared with the trusted data processing system via the communication channel.

18 Claims, 7 Drawing Sheets

(56) References Cited

U.S. PATENT DOCUMENTS

| | | | |
|---|---|---|---|
| 2014/0244768 A1 | 8/2014 | Shuman et al. | |
| 2014/0324973 A1* | 10/2014 | Goel | H04W 4/70 709/204 |
| 2015/0007273 A1* | 1/2015 | Lin | H04L 63/08 726/4 |
| 2015/0020151 A1 | 1/2015 | Ramanathan | |
| 2017/0064556 A1* | 3/2017 | Gilad | H04W 4/70 |
| 2018/0034914 A1* | 2/2018 | Christopher | H04L 69/08 |
| 2019/0349426 A1* | 11/2019 | Smith | H04W 4/08 |

OTHER PUBLICATIONS

Nitti et al., "Trustworthiness Management in the Social Internet of Things", IEEE Transactions on Knowledge and Data Engineering, vol. 26, Issue 5, May 2014, 14 pages.

Underwood et al., "Internet of Things: Toward Smart Networked Systems and Societies", Applied Ontology, vol. 10, 2015, 11 pages. https://www.iab.org/wp-content/IAB-uploads/2016/03/OntoSummit2015_CommNIST_final.pdf.

"Internet of Things", ETSI, accessed Jan. 30, 2018, 2 pages. http://www.etsi.org/technologies-clusters/technologies/internet-ofthings.

Zargari et al., "How often social objects meet each other? Analysis of the properties of a social network of IoT devices based on real data", IEEE Gobecom 2013 Conference, Dec. 2013, 6 pages.

"Lysis Platform", Universita degli Studi de Cagliari, accessed Jan. 30, 2018, 3 pages. http://www.lysis-iot.com/.

Atzori et al., "From 'Smart Objects" to "Social Objects': The Next Evolutionary Step of the Internet of Things", Ad Hoc and Sensor Networks, IEEE Communications Magazine, Jan. 2014, 9 pages.

Ali et al., "A Semantic Processing Framework for IoT-enabled Communication Systems", International Semantic Web Conference, Oct. 24, 2015, 16 pages.

Mori et al., "Secure Connection Assistance Architecture for IoT Devices", 2016 IEEE International Symposium on Local and Metropolitan Area Networks, Jun. 2016, 3 pages.

Alessi et al., "A Web based Virtual Environment as a connection platform between people and IoT", International Multidisciplinary Conference on Computer and Energy Science, Jul. 2016, 6 pages.

Fortino, "Agents Meet the IoT: Toward Ecosystems of Networked Smart Objects", IEEE Systems, Man and Cybernetics Magazine, vol. 2, Issue 2, Apr. 2016, 5 pages.

Vasseur et al., "Interconnecting Smart Objects with IP", Elsevier Inc, Copyright 2010, 432 pages.

* cited by examiner

CREATE MACHINE-TO-MACHINE TRUST TO AUTOMATICALLY SHARE RESOURCES BETWEEN INTERNET OF THINGS DEVICES

BACKGROUND

1. Field

The disclosure relates generally to Internet of Things (IoT) and more specifically to creating machine-to-machine trust to automatically share resources between IoT devices.

2. Description of the Related Art

The Internet of Things (IoT) is a network of physical devices, such as, for example, smart vehicles, smart appliances, smart televisions, smart thermostats, smart watches, smart phones, smart heart monitors, smart pacemakers, smart wearables, gaming devices, robotic devices, sensors, and the like, which are embedded with data processing systems and connectivity enabling these devices to connect and exchange data. Each device is uniquely identifiable through its embedded data processing system and is able to inter-operate within existing network infrastructures.

It is estimated that 30 billion IoT devices will exist by the year 2020. This expansion of IoT devices will create opportunities for more direct integration of the physical world into computer-based systems and result in improved efficiency, accuracy, and economic benefit, along with reduced human intervention.

Social Internet of Things (SIoT) is defined as an IoT where devices are capable of autonomously establishing social relationships with other devices without human interaction. In this way, a social network of devices may be created.

SUMMARY

According to one illustrative embodiment, a computer-implemented method for automatically sharing resources between devices is provided. A data processing system establishes a communication channel with a trusted data processing system over a network. In response to the data processing system establishing the communication channel, the data processing system shares a list of resources available for sharing between the data processing system and the trusted data processing system via the communication channel. The data processing system determines whether a match for a resource requested by the trusted data processing system exists in the list. In response to the data processing system determining that a match for the resource requested by the trusted data processing system exists in the list, the data processing system automatically shares a matching resource with the trusted data processing system via the communication channel. According to other illustrative embodiments, a data processing system and computer program product for automatically sharing resources between devices are provided.

DETAILED DESCRIPTION

Figure 1:
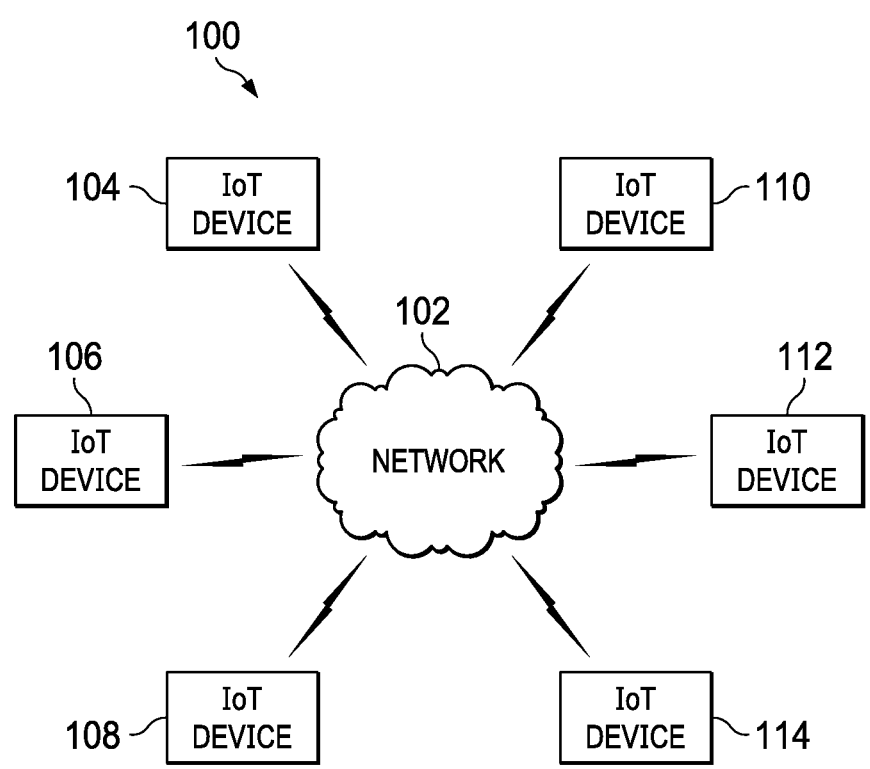
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
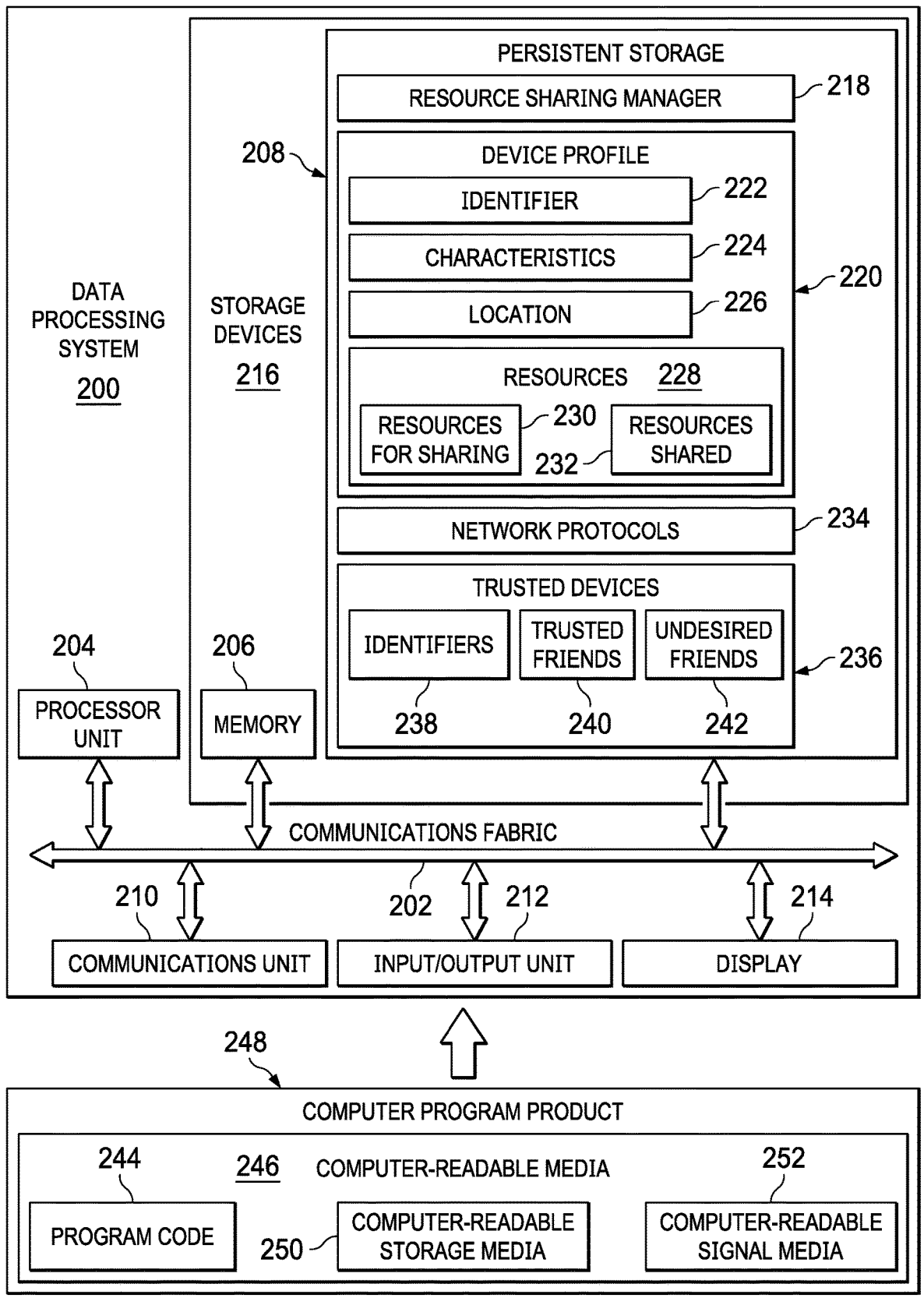
FIG. 2 is a diagram of a data processing system in which illustrative embodiments may be implemented.
Figure 3:
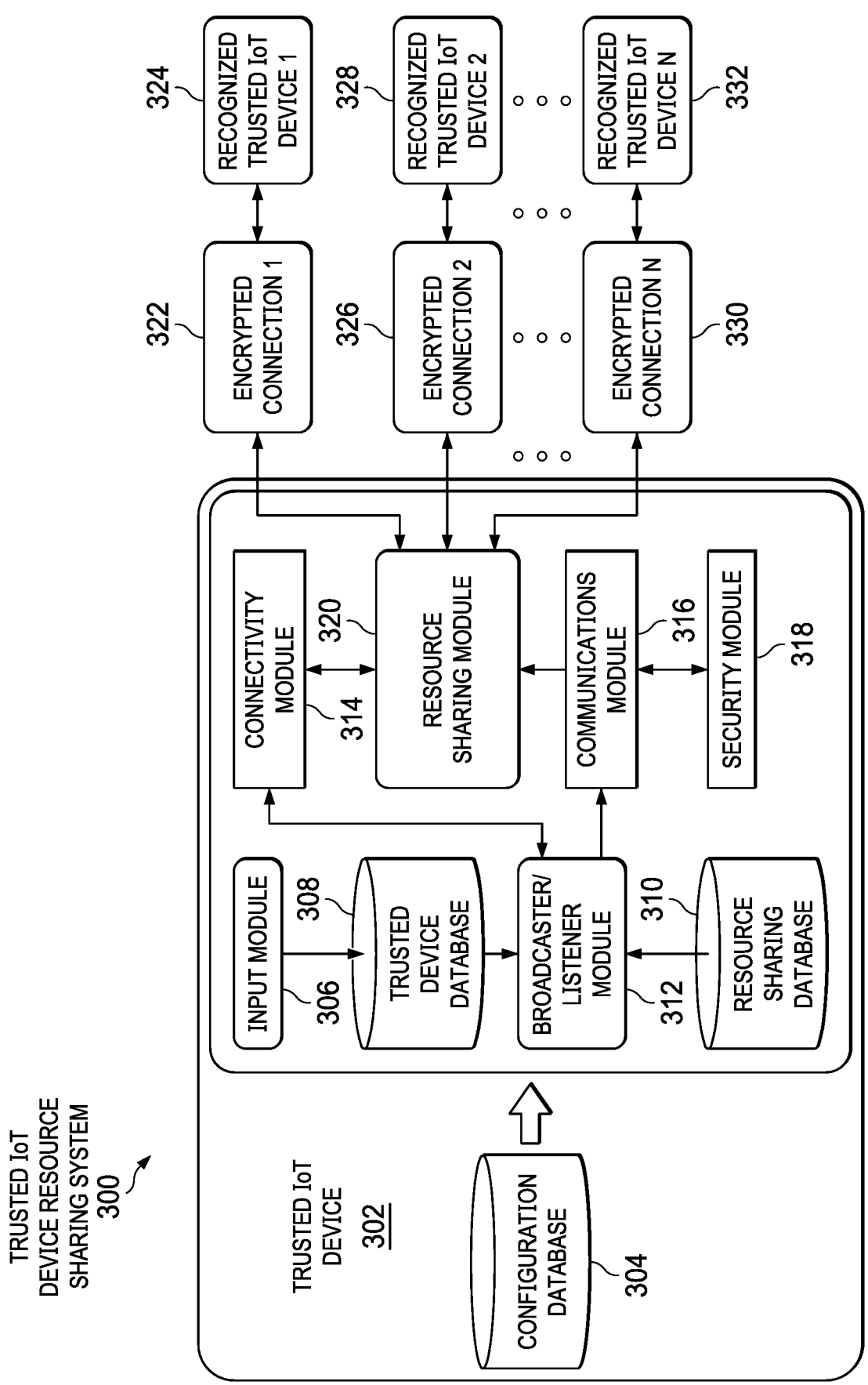
FIG. 3 is a diagram illustrating an example of a trusted Internet of Things device resource sharing system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing devices in which the illustrative embodiments may be implemented. Network data processing system 100 contains network 102, which is the medium used to provide communications links between the data processing devices connected together within network data processing system 100. Network 102 may include connections, such as, for example, wire communication links and wireless communication links.

In the depicted example, Internet of Things (IoT) device 104, IoT device 106, IoT device 108, IoT device 110, IoT device 112, and IoT device 114 connect to network 102. IoT devices 104, 106, 108, 110, 112, and 114 may represent IoT devices of a same type, IoT devices of different types, or a combination of same and different types of IoT devices. For example, IoT devices 104, 106, 108, 110, 112, and 114 may include data processing devices, such as smart vehicles, smart appliances, smart televisions, smart thermostats, smart watches, smart phones, smart heart monitors, smart pacemakers, smart wearables, gaming devices, robotic devices, sensors, or any combination thereof. Of course, it should be noted that IoT devices 104, 106, 108, 110, 112, and 114 may include any other type of IoT device not listed above.

In this example, IoT devices 104, 106, 108, 110, 112, and 114 are illustrated with wireless communication links to network 102. However, it should be noted that one or more of IoT devices 104, 106, 108, 110, 112, and 114 may include wire communication links instead of wireless communication links to network 102. In addition, it should be noted that network data processing system 100 may include any number of IoT devices. In other words, network data processing system 100 may include more or fewer IoT devices than illustrated.

In the depicted example, network data processing system 100 may be implemented as a number of different types of communication networks, such as, for example, an internet, an intranet, a local area network (LAN), a wide area network (WAN), a personal area network (PAN), a peer-to-peer (P2P) network, an unstructured network, an IoT network, an ad-hoc wireless network, or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of an IoT device, such as IoT device 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, or some combination thereof. The media used by persistent storage 208 may be removable. For example, a removable hard drive may be used for persistent storage 208.

In this example, persistent storage 208 stores resource sharing manager 218. Resource sharing manager 218 controls the process of creating machine-to-machine trust to automatically share resources between IoT devices. It should be noted that even though resource sharing manager 218 is illustrated as residing in persistent storage 208, in an alternative illustrative embodiment resource sharing manager 218 may be a separate component of data processing system 200. For example, resource sharing manager 218 may be a hardware component coupled to communication fabric 202 or a combination of hardware and software components.

In this example, persistent storage 208 also stores device profile 220. Device profile 220 includes information corresponding to data processing system 200. For example, device profile 220 includes identifier 222, characteristics 224, location 226, and resources 228. However, it should be noted that alternative illustrative embodiments may include more or less information in device profile 220 than illustrated.

Identifier 222 uniquely identifies data processing system 200, such as a name and/or an alphanumeric identifier. Characteristics 224 include information, such as, for example, manufacturer of data processing system 200, type of IoT device corresponding to data processing system 200, capabilities of data processing system 200, availability of data processing system 200, services provided by data processing system 200, and the like. Location 226 represents information corresponding to a geographic location, such as, for example, global positioning system coordinates, of data processing system 200. Location 226 may represent a fixed location of data processing system 200 or may represent a constantly or intermittently changing location of data processing system 200.

Resources 228 represent all of the resources of data processing system 200. For example, resources 228 may include one or more of data processing resources, data storage resources, software resources, network connectivity resources, service resources, and the like. Resources for sharing 230 represents all or a portion of resources 228 that data processing system 200 is permitted to share with other IoT devices directly connected to data processing system 200 via an encrypted communication channel. Device profile 220 also may include resource sharing rules that define which resources in resources 228 may be shared with which type of IoT device and when.

Resources shared 232 represents a list of resources that data processing system 200 shared from other IoT devices, which are directly connected to data processing system 200 via encrypted communication channels. In other words, resources shared 232 represent resources not currently available on data processing system 200, but are available on other IoT devices for sharing with data processing system 200. In addition, resources shared 232 also may represent a list of which resources data processing system 200 shared with other IoT devices.

In this example, persistent storage 208 also stores network protocols 234. Network protocols 234 represent a list of network protocols, such as, for example, Bluetooth low energy (BLE), Near-Field Communication (NFC), Z-Wave®, Zigbee®, wireless fidelity (Wi-Fi) direct, and the like. Resource sharing manager 218 utilizes network protocols 234 to recognize trusted IoT devices associated with data processing system 200.

In this example, persistent storage 208 also stores trusted devices 236. Trusted devices 236 represent a list of IoT devices that data processing system 200 trusts to share resources with or from. Identifiers 238 represent unique identifiers for each respective trusted IoT device listed in trusted devices 236. Trusted friends 240 represent lists of IoT devices, which correspond to each different trusted device in trusted devices 236, that each respective trusted device identifies as trusted friends to share resources with or from. Resource sharing manager 218 may automatically recognize trusted friends 240 of trusted devices 236 as IoT devices that resource sharing manager 218 trusts to share resources for sharing 230 with or share resources from trusted friends 240. Undesired friends 242 represent a "blacklist" of IoT devices that will not share resources or services with data processing system 200 or obtain resources or services from data processing system 200.

Communications unit 210, in this example, provides for communication with other IoT devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, Wi-Fi, Wi-Fi direct, Bluetooth®, BLE, NFC, Z-Wave®, Zigbee®, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, keyboard, and/or some other suitable input device. Display 214 provides a mechanism to display information to a user. Display 214 also may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from that data processing system to data processing system 200. The data processing system providing program code 244 may be a server computer, an IoT device, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data. Further, a memory may be, for example, memory 206 or a cache such as found in an interface and memory controller hub that may be present in communications fabric 202.

Today devices are getting smarter and human intervention is being reduced to give autonomy to these devices. However, users of these devices are still doing many things the "old-fashioned" way. For example, a user may want to share a network connection of the user's device with a device of someone else. As a result, the user performs the following steps to share the network connection: 1) enable hot-spot on user's device; 2) add the other device to a list of trusted devices; 3) look for the network connection on the other device; 4) select connect; 5) enter a password or passphrase; and 6) select done, for example. Thus, the user performs many steps in order to share the network connection, which may become even more complex if the device has advanced security settings like not broadcasting a service set identifier, for example. With the advent of IoT and interconnected devices, the complexity of performing these types of actions will increase.

Consequently, a novel method is needed to make these devices smarter by making these devices autonomous when sharing resources. Illustrative embodiments provide a method to create machine-to-machine trust to automatically share resources between IoT devices. Illustrative embodiments utilize a "socialization" mechanism for IoT devices to create networks of trusted IoT devices so these trusted IoT devices can rely on other IoT device sharing capabilities to fulfill needs or accomplish tasks. Each IoT device works autonomously to establish its network of trusted IoT devices and decides when and how to utilize these trusted IoT devices based on, for example, geolocation, function to execute, capabilities, and the like. New IoT devices to the network publish their respective capabilities and needs once identified as trusted so each IoT device can determine whether to perform resource sharing or not. It should be noted that illustrative embodiments only perform sharing of resources between IoT devices in a trusted relationship.

Each IoT device stores data corresponding to its trusted friends so it can use these trusted friends in the future for sharing resources.

Thus, illustrative embodiments enable IoT device automation on tasks regarding resource sharing with trusted IoT devices. As a result, illustrative embodiments reduce human intervention, enable IoT device autonomy, increase IoT device performance and efficiency, and increase user experience.

For example, an IoT device is added as a trusted device on an ad-hoc wireless network. An ad hoc network is a network that is composed of individual devices communicating with each other directly. A user may select the resources (services, features, et cetera) on the trusted IoT device that the user wants to share with other IoT devices on the ad-hoc wireless network. In addition, the user may select how to recognize trusted IoT devices using particular network protocols, such as, for example, BLE, NFC, Wi-Fi, et cetera. Further, the user may enable or disable broadcasting and/or listening for trusted devices. Once another IoT device is within range of a particular network protocol, the trusted IoT devices performs a handshake with the other IoT device to start an encrypted communication session. After the encrypted communication session is established, the trusted IoT device shares a list of the resources available for sharing with the other IoT device. If the other IoT device is requesting a certain resource that is included in the list of resources available for sharing, the trusted IoT device enters a sharing state and automatically starts sharing that resource with the other IoT device via the encrypted connection. Once the other IoT device is out of range of the particular network protocol, the trusted IoT device closes the encrypted connection and switches back to its original operating state.

As an example of an industrial IoT application, when on-boarding a new robotic IoT device to a production line that includes a plurality of robotic IoT devices, a production line administrator needs to perform all of the setup including, but not limited to, configuring the network, configuring security policies, such as ports, firewall, users, et cetera, as well as other settings, for each respective IoT device in the product line. Using illustrative embodiments, the production line administrator only needs to configure one robotic IoT device on the production line and enable the settings of that robotic IoT device for sharing with other robotic IoT devices on the production line. Now every time a new robotic IoT device, which is identified as a trusted device, is on-boarded to the production line, that first robotic IoT device or a subsequently added robotic IoT device automatically shares all the settings with the newly on-boarded robotic IoT device.

As an example of a wearable IoT application, one user pairs two smart watches as trusted devices. One smart watch includes a 3G connectivity resource, while the other smart watch does not. When the two paired smart watches come within range of a network protocol, such as, for example, Bluetooth, the smart watch with the 3G connectivity resource switches to a sharing mode, opens an encrypted communication channel with the other smart watch, and automatically starts sharing the 3G connectivity resource with the other smart watch. This sharing process occurs without user intervention.

With reference now to FIG. 3, a diagram illustrating an example of a trusted IoT device resource sharing system is depicted in accordance with an illustrative embodiment. Trusted IoT device resource sharing system 300 is a system of software and hardware components for creating machine-to-machine trust to automatically share resources between IoT devices. Trusted IoT device resource sharing system 300 may be implemented in a network of data processing systems, such as network data processing system 100 in FIG. 1.

In this example, trusted IoT device resource sharing system 300 includes trusted IoT device 302. Trusted IoT device 302 may be, for example, IoT device 104 in FIG. 1 or data processing system 200 in FIG. 2. In this example, trusted IoT device 302 includes configuration database 304, input module 306, trusted device database 308, resource sharing database 310, broadcaster/listener module 312, connectivity module 314, communications module 316, security module 318, and resource sharing module 320. However, it should be noted that in alternative illustrative embodiments trusted IoT device 302 may include more or fewer components than illustrated. For example, two or more components may be combined into one component, one component may be split into two or more components, one or more components shown may be removed, one or more components not shown may be added, and the like.

Configuration database 304 contains configuration information corresponding to trusted IoT device 302. The configuration information may include, for example, identifiers, settings, characteristics, properties, functionalities, and the like, for trusted IoT device 302.

Input module 306 handles the addition and removal of data to trusted device database (DB) 308. Trusted device database 308 stores a list of all the trusted devices corresponding to trusted IoT device 302. In other words, input module 306 manages the addition and removal of trusted devices listed in trusted device database 308. This works as a one-time, two-way authorization mechanism, which is triggered by a user of trusted IoT device 302, when another IoT device sends a request for resource sharing. Trusted IoT device 302 either accepts or rejects the request based on data stored in trusted device database 308. This process keeps trusted IoT device 302 secure and prevents access by unauthorized users or unknown IoT devices.

Alternatively, trusted IoT device 302 may automatically establish trusted relationships with other IoT devices without user intervention. For example, the trusted friend of my trusted friend is my trusted friend. Each trusted IoT device on the network broadcasts an encrypted list of trusted friends to other trusted IoT devices on the network. In addition, each trusted IoT device listens to the broadcasts and compares each of the received lists of trusted friends with its own trusted device database, such as trusted device database 308. If trusted IoT devices in lists match, then a friend in common exists between trusted IoT devices. In this case, a listening IoT device automatically adds common trusted friends to its own list of trusted IoT devices (i.e., trusted device database 308).

As another alternative, each trusted IoT device broadcasts its own list of trusted friends via an encrypted communication channel on the network. Each trusted IoT device listens to the broadcasts and compares received lists of trusted friends with its own trusted device database. If trusted IoT devices in lists match, then a friend in common exists between trusted IoT devices. In this example, the listening IoT device sends a notification to its user regarding a commonly trusted IoT device that is within range of a network protocol and provides a recommendation to send a request to the commonly trusted IoT device to be added as a trusted device. The user then has the option to send the request to be added as a trusted device or not.

As a further alternative, each trusted IoT device broadcasts its own characteristics, such as, for example, manufacturer, make, and model via the encrypted communication channel. Each trusted IoT device listens to the broadcasts and compares received device characteristics with its own characteristic information. If characteristics match, then the listening IoT device determines that they are the same or similar type of device (e.g., same or similar type of robotic IoT device on a production line). In this case, the listening IoT device sends a notification to its user/administrator regarding the same type of IoT device and provides a recommendation to send a request to the same type of IoT device to be added as a trusted device. The user then has the option to send the request to be added as a trusted device or not.

As a further alternative, a user can configure a trusted IoT device to broadcast a request for a particular resource that the trusted IoT device does not have. If another IoT device on the network has that particular resource available to share, the trusted IoT device sends a notification to the user regarding the other IoT device's willingness to share that particular resource. The user then has the option to accept the sharing of the resources from the other IoT device or reject the offer. If the user accepts the offer, then the trusted IoT device adds the other IoT device to its list of trusted devices and receives the resource from the other IoT device.

Resource sharing database 310 stores all the information related to the resources corresponding to trusted IoT device 302. The information may include, but is not limited to, a list of all resources included in trusted IoT device 302, a list of those resources available for sharing by trusted IoT device 302, and a list of shared resources to other trusted IoT devices from trusted IoT device 302 and/or a list of shared resources to trusted IoT device 302 from other trusted IoT devices.

Broadcaster/listener module 312 performs two functions. One function is to broadcast the unique identifier, such as identifier 222 in FIG. 2, corresponding to trusted IoT device 302 to other trusted IoT devices on the network. The other function is to listen for identifiers of the other trusted IoT devices on the network.

Connectivity module 314 handles all wireless communications for trusted IoT device 302. Connectivity module 314 may utilize these communications to support broadcaster/listener module 312 and support the sharing of resources by resource sharing module 320.

Communications module 316 handles communication with other trusted IoT devices including the establishment and closure of communication channels. Security module 318 handles the encryption and decryption of communications between trusted IoT device 302 and the other IoT devices on the network.

Resource sharing module 320, which is supported by connectivity module 314, controls resource sharing between trusted IoT device 302 and the other IoT devices on the network. Resource sharing module 320 utilizes encrypted connection 1 322 to conduct resource sharing between trusted IoT device 302 and recognized trusted IoT device 1 324. Similarly, resource sharing module 320 utilizes encrypted connection 2 326 to conduct resource sharing between trusted IoT device 302 and recognized trusted IoT device 2 328 and encrypted connection "n" 330 to conduct resource sharing between trusted IoT device 302 and recognized trusted IoT device "n" 332.

However, it should be noted that trusted IoT device resource sharing system 300 is only meant as an example and not as a limitation on illustrative embodiments. In other words, trusted IoT device resource sharing system 300 may include any number of trusted IoT devices.

Figure 4A:
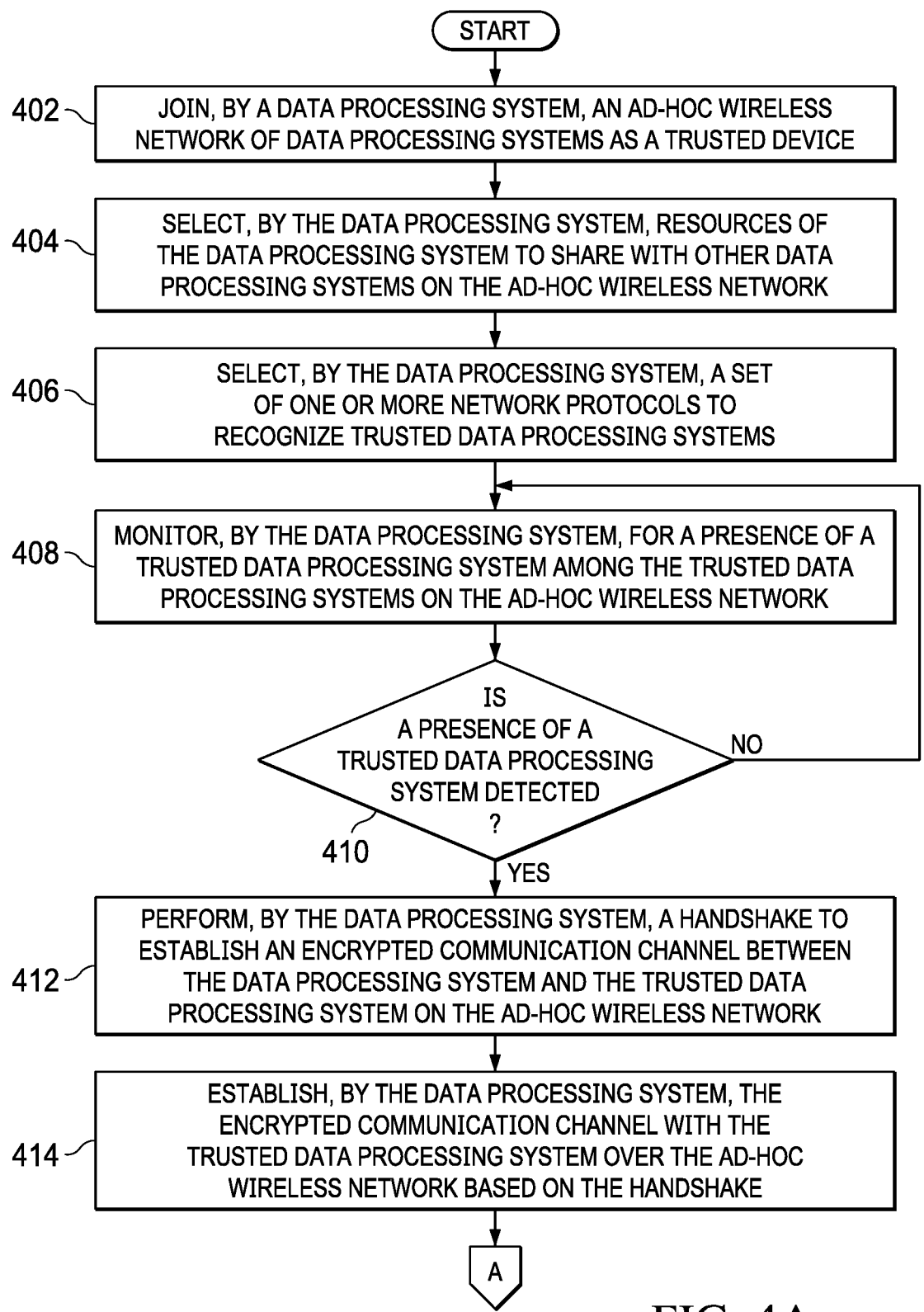
FIGS. 4A-4B are a flowchart illustrating a process for automatically sharing resources among trusted Internet of Things devices in accordance with an illustrative embodiment.
Figure 4B:
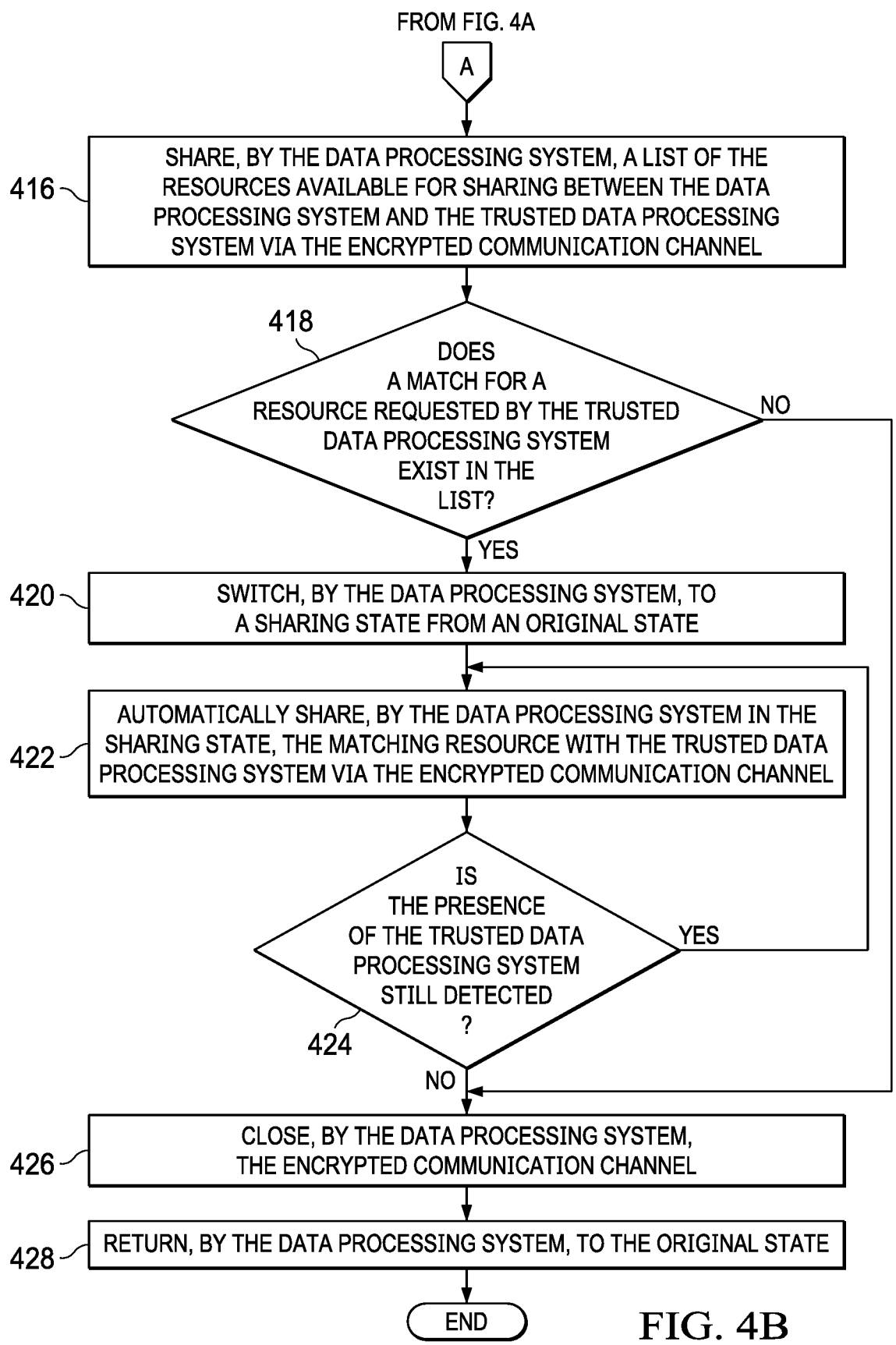

With reference now to FIGS. 4A-4B, a flowchart illustrating a process for automatically sharing resources among trusted IoT devices is shown in accordance with an illustrative embodiment. The process shown in FIGS. 4A-4B may be implemented in a data processing system, such as, for example, IoT device 104 in FIG. 1, data processing system 200 in FIG. 2, or trusted IoT device 302 in FIG. 3.

The process begins when the data processing system joins an ad-hoc wireless network of data processing systems as a trusted device (step 402). In response to joining the ad-hoc wireless network, the data processing system selects resources of the data processing system to share with other data processing systems on the ad-hoc wireless network (step 404). The data processing system may automatically select resources for sharing using a device profile that includes resources for sharing, such as, for example, device profile 220 that includes resources for sharing 230 in FIG. 2. In addition, the data processing system selects a set of one or more network protocols, such as network protocols 234 in FIG. 2, to recognize trusted data processing systems (step 406). The set of network protocols may include, for example, BLE, NFC, Wi-Fi direct, and the like. Further, the data processing system monitors for a presence of a trusted data processing system among the trusted data processing systems on the ad-hoc wireless network (step 408).

Subsequently, the data processing system makes a determination as to whether a presence of a trusted data processing system is detected (step 410). If the data processing system does not detect the presence of a trusted data processing system, no output of step 410, then the process returns to step 408 where the data processing system continues to monitor for the presence of a trusted data processing system. If the data processing system detects the presence of a trusted data processing system, yes output of step 410, then the data processing system performs a handshake to establish an encrypted communication channel between the data processing system and the trusted data processing system on the ad-hoc wireless network (step 412).

The data processing system establishes the encrypted communication channel with the trusted data processing system over the ad-hoc wireless network based on the handshake (step 414). The data processing system also shares a list of the resources available for sharing between the data processing system and the trusted data processing system via the encrypted communication channel (step 416). Afterward, the data processing system makes a determination as to whether a match for a resource requested by the trusted data processing system exists in the list (step 418).

If the data processing system determines that no match for a resource requested by the trusted data processing system exists in the list, no output of step 418, then the process proceeds to step 426. If the data processing system determines that a match for a resource requested by the trusted data processing system does exist in the list, yes output of step 418, then the data processing system switches to a sharing state from an original state (step 420). Furthermore, the data processing system, in the sharing state, automatically shares the matching resource with the trusted data processing system via the encrypted communication channel (step 422).

Subsequently, the data processing system makes a determination as to whether the presence of the trusted data processing system is still detected (step 424). If the data processing system still detects the presence of the trusted data processing system, yes output of step 424, then the process returns to step 422 where the data processing system continues to share the matching resource. If the data processing system determines that the presence of the trusted data processing system is no longer detected, no output of step 424, then the data processing system closes the encrypted communication channel (step 426). The data processing system also returns to the original state (step 428). Thereafter, the process terminates.

Figure 5:
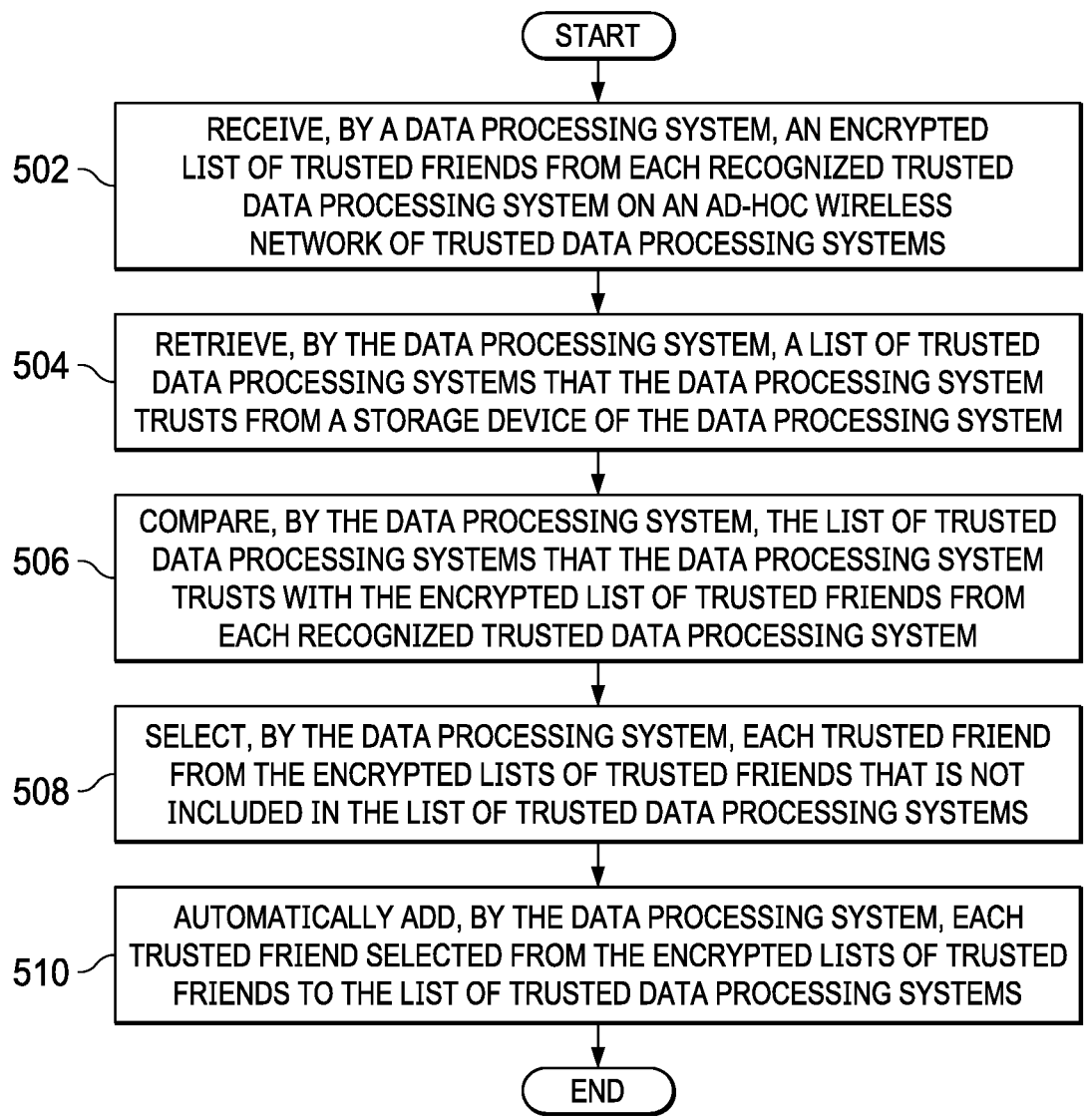
FIG. 5 is a flowchart illustrating a process for automatically adding trusted Internet of Things friend devices in accordance with an illustrative embodiment.

With reference now to FIG. 5, a flowchart illustrating a process for automatically adding trusted IoT friend devices is shown in accordance with an illustrative embodiment. The process shown in FIG. 5 may be implemented in a data processing system, such as, for example, IoT device 104 in FIG. 1, data processing system 200 in FIG. 2, or trusted IoT device 302 in FIG. 3.

The process begins when the data processing system receives an encrypted list of trusted friends from each recognized trusted data processing system on an ad-hoc wireless network of trusted data processing systems (step 502). In response to receiving the encrypted lists of trusted friends, the data processing system retrieves a list of trusted data processing systems that the data processing system trusts from a storage device of the data processing system (step 504). In addition, the data processing system compares the retrieved list of trusted data processing systems that the data processing system trusts with the encrypted list of trusted friends received from each recognized trusted data processing system (step 506).

In response to comparing the lists, the data processing system selects each trusted friend from the encrypted lists of trusted friends that is not included in the retrieved list of trusted data processing systems (step 508). Afterward, the data processing system automatically adds each trusted friend selected from the encrypted lists of trusted friends to the retrieved list of trusted data processing systems (step 510). Thereafter, the process terminates.

Figure 6:
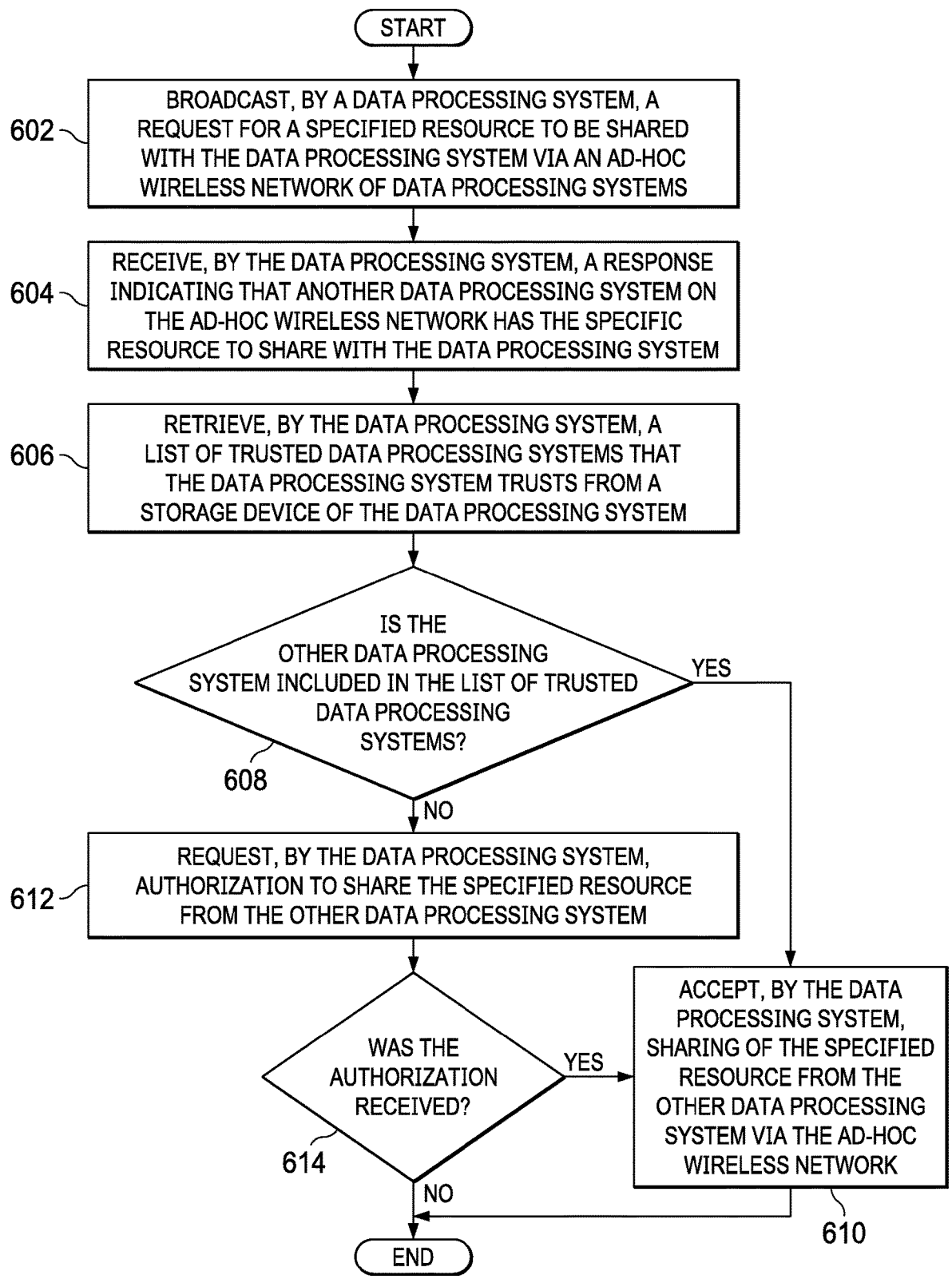
FIG. 6 is a flowchart illustrating a process for accepting resource sharing from another Internet of Things device in accordance with an illustrative embodiment.

With reference now to FIG. 6, a flowchart illustrating a process for accepting resource sharing from another IoT device is shown in accordance with an illustrative embodiment. The process shown in FIG. 6 may be implemented in a data processing system, such as, for example, IoT device 104 in FIG. 1, data processing system 200 in FIG. 2, or trusted IoT device 302 in FIG. 3.

The process begins when the data processing system broadcasts a request for a specified resource to be shared with the data processing system via an ad-hoc wireless network of data processing systems (step 602). In response to broadcasting the request, the data processing system receives a response indicating that another data processing system on the ad-hoc wireless network has the specific resource to share with the data processing system (step 604). In response to receiving the response, the data processing system retrieves a list of trusted data processing systems that the data processing system trusts from a storage device of the data processing system (step 606).

Subsequent to retrieving the list, the data processing system makes a determination as to whether the other data processing system is included in the list of trusted data processing systems (step 608). If the data processing system determines that the other data processing system is included in the list of trusted data processing systems, yes output of step 608, then the data processing system accepts sharing of the specified resource from the other data processing system via the ad-hoc wireless network (step 610). Thereafter, the process terminates. If the data processing system determines that the other data processing system is not included in the list of trusted data processing systems, no output of step 608, then the data processing system requests authorization to share the specified resource from the other data processing system (step 612). The data processing system may send the request for authorization to a user or administrator of the data processing system, for example.

Subsequently, the data processing system makes a determination as to whether the authorization was received (step 614). If the data processing system determines that the authorization was received, yes output of step 614, then the process returns to step 610 where the data processing system accepts sharing of the specified resource from the other data processing system. If the data processing system determines that the authorization was not received, no output of step 614, then the process terminates thereafter.

Thus, illustrative embodiments of the present invention provide a computer-implemented method, data processing system, and computer program product for creating machine-to-machine trust to automatically share resources between IoT devices. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically sharing resources between devices, the computer-implemented method comprising:

establishing, by a data processing system, a communication channel with a trusted data processing system over a network;

responsive to the data processing system establishing the communication channel, sharing, by the data processing system, a list of resources available for sharing between the data processing system and the trusted data processing system via the communication channel;

determining, by the data processing system, whether a match for a resource requested by the trusted data processing system exists in the list;

responsive to the data processing system determining that a match for the resource requested by the trusted data processing system exists in the list, automatically sharing, by the data processing system, a matching resource with the trusted data processing system via the communication channel;

receiving, by the data processing system, a list of trusted friends from recognized trusted data processing systems on the network;

responsive to the data processing system receiving lists of trusted friends, retrieving, by the data processing system, a list of trusted data processing systems that the data processing system trusts and comparing, by the data processing system, the list of trusted data processing systems that the data processing system trusts with the list of trusted friends received from the recognized trusted data processing systems;

responsive to the data processing system comparing the list of trusted data processing systems that the data processing system trusts with the list of trusted friends received from the recognized trusted data processing systems, selecting, by the data processing system, trusted friends from lists of trusted friends that are not included in the list of trusted data processing systems; and adding, by the data processing system, the trusted friends selected from the lists of trusted friends to the list of trusted data processing systems.

2. The computer-implemented method of claim 1 further comprising:
joining, by the data processing system, the network as a trusted device; and
responsive to the data processing system joining the network as a trusted device, selecting, by the data processing system, resources of the data processing system to share with other data processing systems on the network and selecting, by the data processing system, a set of network protocols to recognize trusted data processing systems.

3. The computer-implemented method of claim 2, wherein the set of network protocols to recognize trusted data processing systems is selected from a group consisting of Bluetooth, Bluetooth low energy, Near-Field Communication, Z-wave, Zigbee, wireless fidelity, and wireless fidelity direct.

4. The computer-implemented method of claim 1 further comprising:
monitoring, by the data processing system, for a presence of the trusted data processing system on the network;
determining, by the data processing system, whether the presence of the trusted data processing system is detected; and
responsive to the data processing system detecting the presence of the trusted data processing system, performing, by the data processing system, a handshake to establish the communication channel between the data processing system and the trusted data processing system on the network.

5. The computer-implemented method of claim 4 further comprising:
determining, by the data processing system, whether the presence of the trusted data processing system is still detected; and
responsive to the data processing system determining that the presence of the trusted data processing system is no longer detected, closing, by the data processing system, the communication channel.

6. The computer-implemented method of claim 1 further comprising:
broadcasting, by the data processing system, a request for a specified resource to be shared with the data processing system via the network;
receiving, by the data processing system, a response indicating that another data processing system on the network has the specific resource to share with the data processing system;
retrieving, by the data processing system, a list of trusted data processing systems that the data processing system trusts; and
determining, by the data processing system, whether the other data processing system is included in the list of trusted data processing systems.

7. The computer-implemented method of claim 6 further comprising:
responsive to the data processing system determining that the other data processing system is included in the list of trusted data processing systems, accepting, by the data processing system, sharing of the specified resource from the other data processing system via the network.

8. The computer-implemented method of claim 6 further comprising:
responsive to the data processing system determining that the other data processing system is not included in the list of trusted data processing systems, requesting, by the data processing system, authorization to share the specified resource from the other data processing system; and
responsive to the data processing system determining that the authorization was received, accepting, by the data processing system, sharing of the specified resource from the other data processing system.

9. The computer-implemented method of claim 1, wherein the communication channel is an encrypted communication channel, and wherein the network is an ad-hoc wireless network, and wherein the data processing system is a first Internet of Things device and the trusted data processing system is a second Internet of Things device.

10. A data processing system for automatically sharing resources between devices, the data processing system comprising:
a bus system;
a storage device connected to the bus system, wherein the storage device stores program instructions; and
a processor connected to the bus system, wherein the processor executes the program instructions to:
establish a communication channel with a trusted data processing system over a network;
share a list of resources available for sharing between the data processing system and the trusted data processing system via the communication channel in response to establishing the communication channel;
determine whether a match for a resource requested by the trusted data processing system exists in the list;
automatically share a matching resource with the trusted data processing system via the communication channel;
receive a list of trusted friends from recognized trusted data processing systems on the network;
retrieve a list of trusted data processing systems that the data processing system trusts and compare the list of trusted data processing systems that the data processing system trusts with the list of trusted friends received from the recognized trusted data processing systems responsive to the data processing system receiving lists of trusted friends;
select trusted friends from lists of trusted friends that are not included in the list of trusted data processing systems responsive to the data processing system comparing the list of trusted data processing systems that the data processing system trusts with the list of trusted friends received from the recognized trusted data processing systems; and
add the trusted friends selected from the lists of trusted friends to the list of trusted data processing systems.

11. The data processing system of claim 10, wherein the processor further executes the program instructions to:
join the network as a trusted device;
select resources of the data processing system to share with other data processing systems on the network and select a set of network protocols to recognize trusted data processing systems in response to joining the network as a trusted device.

12. A computer program product for automatically sharing resources between devices, the computer program product comprising a computer readable storage medium having program instructions embodied therewith, the program instructions executable by a data processing system to cause the data processing system to perform a method comprising:

establishing, by the data processing system, a communication channel with a trusted data processing system over a network;
responsive to the data processing system establishing the communication channel, sharing, by the data processing system, a list of resources available for sharing between the data processing system and the trusted data processing system via the communication channel;
determining, by the data processing system, whether a match for a resource requested by the trusted data processing system exists in the list;
responsive to the data processing system determining that a match for the resource requested by the trusted data processing system exists in the list, automatically sharing, by the data processing system, a matching resource with the trusted data processing system via the communication channel;
receiving, by the data processing system, a list of trusted friends from recognized trusted data processing systems on the network;
responsive to the data processing system receiving lists of trusted friends, retrieving, by the data processing system, a list of trusted data processing systems that the data processing system trusts and comparing, by the data processing system, the list of trusted data processing systems that the data processing system trusts with the list of trusted friends received from the recognized trusted data processing systems;
responsive to the data processing system comparing the list of trusted data processing systems that the data processing system trusts with the list of trusted friends received from the recognized trusted data processing systems, selecting, by the data processing system, trusted friends from lists of trusted friends that are not included in the list of trusted data processing systems; and
adding, by the data processing system, the trusted friends selected from the lists of trusted friends to the list of trusted data processing systems.

13. The computer program product of claim 12 further comprising:
joining, by the data processing system, the network as a trusted device; and
responsive to the data processing system joining the network as a trusted device, selecting, by the data processing system, resources of the data processing system to share with other data processing systems on the network and selecting, by the data processing system, a set of network protocols to recognize trusted data processing systems.

14. The computer program product of claim 12 further comprising:
monitoring, by the data processing system, for a presence of the trusted data processing system on the network;
determining, by the data processing system, whether the presence of the trusted data processing system is detected; and
responsive to the data processing system detecting the presence of the trusted data processing system, performing, by the data processing system, a handshake to establish the communication channel between the data processing system and the trusted data processing system on the network.

15. The computer program product of claim 14 further comprising:
determining, by the data processing system, whether the presence of the trusted data processing system is still detected; and
responsive to the data processing system determining that the presence of the trusted data processing system is no longer detected, closing, by the data processing system, the communication channel.

16. The computer program product of claim 12 further comprising:
broadcasting, by the data processing system, a request for a specified resource to be shared with the data processing system via the network;
receiving, by the data processing system, a response indicating that another data processing system on the network has the specific resource to share with the data processing system;
retrieving, by the data processing system, a list of trusted data processing systems that the data processing system trusts; and
determining, by the data processing system, whether the other data processing system is included in the list of trusted data processing systems.

17. The computer program product of claim 16 further comprising:
responsive to the data processing system determining that the other data processing system is included in the list of trusted data processing systems, accepting, by the data processing system, sharing of the specified resource from the other data processing system via the network.

18. The computer program product of claim 16 further comprising:
responsive to the data processing system determining that the other data processing system is not included in the list of trusted data processing systems, requesting, by the data processing system, authorization to share the specified resource from the other data processing system; and
responsive to the data processing system determining that the authorization was received, accepting, by the data processing system, sharing of the specified resource from the other data processing system.

* * * * *